US012712776B2

(12) United States Patent
Ben Hadj Fredj et al.

(10) Patent No.: US 12,712,776 B2
(45) Date of Patent: Aug. 18, 2026

(54) ASYNCHRONOUS NON-ORTHOGONAL MULTIPLE ACCESS FOR AMBIENT INTERNET OF THINGS (AIoT) DEVICES

(71) Applicant: Lenovo (United States) Inc., Morrisville, NC (US)

(72) Inventors: Abir Ben Hadj Fredj, Frankfurt am Main (DE); Karthikeyan Ganesan, Nauheim (DE); Ali Ramadan Ali, Kraiburg am Inn (DE)

(73) Assignee: Lenovo (United States) Inc., Morrisville, NC (US)

( * ) Notice: Subject to any disclaimer, the term of this patent is extended or adjusted under 35 U.S.C. 154(b) by 60 days.

(21) Appl. No.: 18/887,944

(22) Filed: Sep. 17, 2024

(65) Prior Publication Data

US 2026/0081818 A1 Mar. 19, 2026

(51) Int. Cl.
*H04L 27/26* (2006.01)

(52) U.S. Cl.
CPC ...... *H04L 27/2657* (2013.01); *H04L 27/2675* (2013.01)

(58) Field of Classification Search
CPC ........................ H04L 27/2657; H04L 27/2675
USPC .......................................................... 375/262
See application file for complete search history.

(56) References Cited

U.S. PATENT DOCUMENTS

2023/0079385 A1* 3/2023 Luo ........................ G06N 3/044
375/262

* cited by examiner

*Primary Examiner* — Dominic D Saltarelli
(74) *Attorney, Agent, or Firm* — AMPACC Law Group, PLLC

(57) ABSTRACT

Various aspects of the present disclosure relate to performing non-orthogonal multiple access (NOMA) for ambient Internet of Things (AIoT) devices. For example, each AIoT device of a group of AIoT devices (e.g., a group of AIoT devices associated with a reader device) may append to transmitted data a prefix at the start of one or more chips with the transmitted data. An associated network entity may determine a length or duration of the prefix (or prefixes). In doing so, the NOMA mechanism enables the AIoT devices to utilize NOMA when transmitting data.

12 Claims, 14 Drawing Sheets

400

500

600

ASYNCHRONOUS NON-ORTHOGONAL MULTIPLE ACCESS FOR AMBIENT INTERNET OF THINGS (AIoT) DEVICES

TECHNICAL FIELD

The present disclosure relates to wireless communications, and more specifically to asynchronous non-orthogonal multiple access (NOMA) for Internet of Things (IoT) devices, such as ambient IoT (AIoT) devices.

BACKGROUND

A wireless communications system may include one or multiple network communication devices, such as base stations, which may support wireless communications for one or multiple user communication devices, which may be otherwise known as user equipment (UE), or other suitable terminology. The wireless communications system may support wireless communications with one or multiple user communication devices by utilizing resources of the wireless communication system (e.g., time resources (e.g., symbols, slots, subframes, frames, or the like) or frequency resources (e.g., subcarriers, carriers, or the like). Additionally, the wireless communications system may support wireless communications across various radio access technologies including third generation (3G) radio access technology, fourth generation (4G) radio access technology, fifth generation (5G) radio access technology, among other suitable radio access technologies beyond 5G (e.g., sixth generation (6G)).

Ambient power-enabled devices, such as AIoT devices, may be battery-free and have limited energy storage capabilities (e.g., store a limited amount of energy using capacitors) or other capability restrictions. These devices may store energy by harvesting energy from the environment of the AIoT device, such as via radio waves, light, heat, motion, and other energy/power sources available to the AIoT device.

SUMMARY

An article "a" before an element is unrestricted and understood to refer to "at least one" of those elements or "one or more" of those elements. The terms "a," "at least one," "one or more," and "at least one of one or more" may be interchangeable. As used herein, including in the claims, "or" as used in a list of items (e.g., a list of items prefaced by a phrase such as "at least one of" or "one or more of" or "one or both of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on. Further, as used herein, including in the claims, a "set" may include one or more elements.

The present disclosure relates to methods, apparatuses, and systems that support the asynchronous NOMA for IoT devices, such as AIoT devices.

Some implementations of the method and apparatuses described herein may further include a UE for wireless communication, comprising at least one memory, and at least one processor coupled with the at least one memory and configured to cause the UE to determine one or more groups of chips for transmission over a physical device-to-reader channel (PDRCH), wherein the transmission comprises a preamble and a postamble, and wherein the one or more groups of chips for transmission over the PDRCH are located between the preamble and the postamble, append a prefix to each group of chips of the one or more groups of chips, wherein the prefix is appended to a beginning chip of each group of chips, and perform the transmission on the PDRCH over one or more non-orthogonal resources.

In some implementations of the method and apparatuses described herein, the at least one processor is configured to cause the UE to perform the transmission on the PDRCH over the one or more non-orthogonal resources to a network entity or a reader device.

In some implementations of the method and apparatuses described herein, each group of chips comprises a quantity of chips, and wherein the quantity of chips is based at least in part on a configuration.

In some implementations of the method and apparatuses described herein, the configuration is based on a length of the PDRCH, variations of a sampling frequency offset (SFO) over time at the UE, variations of a carrier frequency offset (CFO) over time at the UE, or combinations thereof.

In some implementations of the method and apparatuses described herein, the at least one processor is configured to cause the UE to receive signaling that indicates a configuration from a network entity or a reader device, wherein the signaling comprises a medium access control-control element (MAC-CE).

In some implementations of the method and apparatuses described herein, the at least one processor is configured to cause the UE to receive an indication of an orthogonal sequence, wherein the prefix comprises the orthogonal sequence, and wherein the orthogonal sequence is associated with auto-correlation properties or cross-correlation properties satisfying a criterion.

In some implementations of the method and apparatuses described herein, a length of the prefix is based on a highest timing error caused by a sampling frequency offset (SFO) associated with another UE of a group of UEs, including the UE, that share the one or more non-orthogonal resources.

In some implementations of the method and apparatuses described herein, the at least one processor is configured to cause the UE to receive a configuration that identifies a certain delay of transmission based on a size of the PDRCH and perform the transmission on the PDRCH after the certain delay.

In some implementations of the method and apparatuses described herein, the UE is an AIoT device.

In some implementations of the method and apparatuses described herein, the UE is a passive AIoT device, a semi-passive AIoT device, or an active AIoT device.

Some implementations of the method and apparatuses described herein may further include a reader device for wireless communication, comprising at least one memory and at least one processor coupled with the at least one memory and configured to cause the reader device to receive, via one or more non-orthogonal resources from multiple AIoT devices, multiple PDRCH signals superposed at the reader device and perform a multi-user detection operation to detect and decode the received superposed PDRCH signals.

In some implementations of the method and apparatuses described herein, the at least one processor is further configured to cause the reader device to remove prefixes within the multiple PDRCH signals before performing the multi-user detection operation.

In some implementations of the method and apparatuses described herein, the reader device is configured to identify sequences of the prefixes and locate positions of the prefixes within the multiple PDRCH signals.

Some implementations of the method and apparatuses described herein may further include a network entity for wireless communication, comprising at least one memory and at least one processor coupled with the at least one memory and configured to cause the network entity to receive pilot bits from a group of AIoT devices, estimate a timing error at each AIoT device of the group of AIoT devices, and transmit a prefix configuration to the group of AIoT devices, wherein the prefix configuration includes: a group identifier for the group of AIoT devices, a quantity of chips to include in PDRCH transmissions, and a prefix duration for a prefix added to each PDRCH transmission, wherein the prefix duration is based on the estimated timing error.

In some implementations of the method and apparatuses described herein, the prefix configuration is transmitted to the group of AIoT devices via the PDRCH or a MAC-CE.

In some implementations of the method and apparatuses described herein, the at least one processor is further configured to cause the network entity to configure the group of AIoT devices to transmit the pilot bits in a periodic manner in response to a change in an SFO value over time.

In some implementations of the method and apparatuses described herein, at least one processor is further configured to cause the network entity to trigger the group of AIoT devices to transmit the pilot bits in response to a failure of mitigating timing errors using the prefix duration.

In some implementations of the method and apparatuses described herein, the prefix configuration includes a window for which the prefix is valid for the group of AIoT devices.

Some implementations of the method and apparatuses described herein may further include a processor for wireless communication, comprising at least one controller coupled with the at least one memory and configured to cause the processor to determine one or more groups of chips for transmission over a PDRCH, wherein the transmission comprises a preamble and a postamble, and wherein the one or more groups of chips for transmission over the PDRCH are located between the preamble and the postamble, append a prefix to each group of chips of the one or more groups of chips, wherein the prefix is appended to a beginning chip of each group of chips, and perform the transmission on the PDRCH over non-orthogonal resources.

In some implementations of the method and apparatuses described herein, each group of chips comprises a quantity of chips, and wherein the quantity of chips is based at least in part on a configuration.

DETAILED DESCRIPTION

Figure 1:
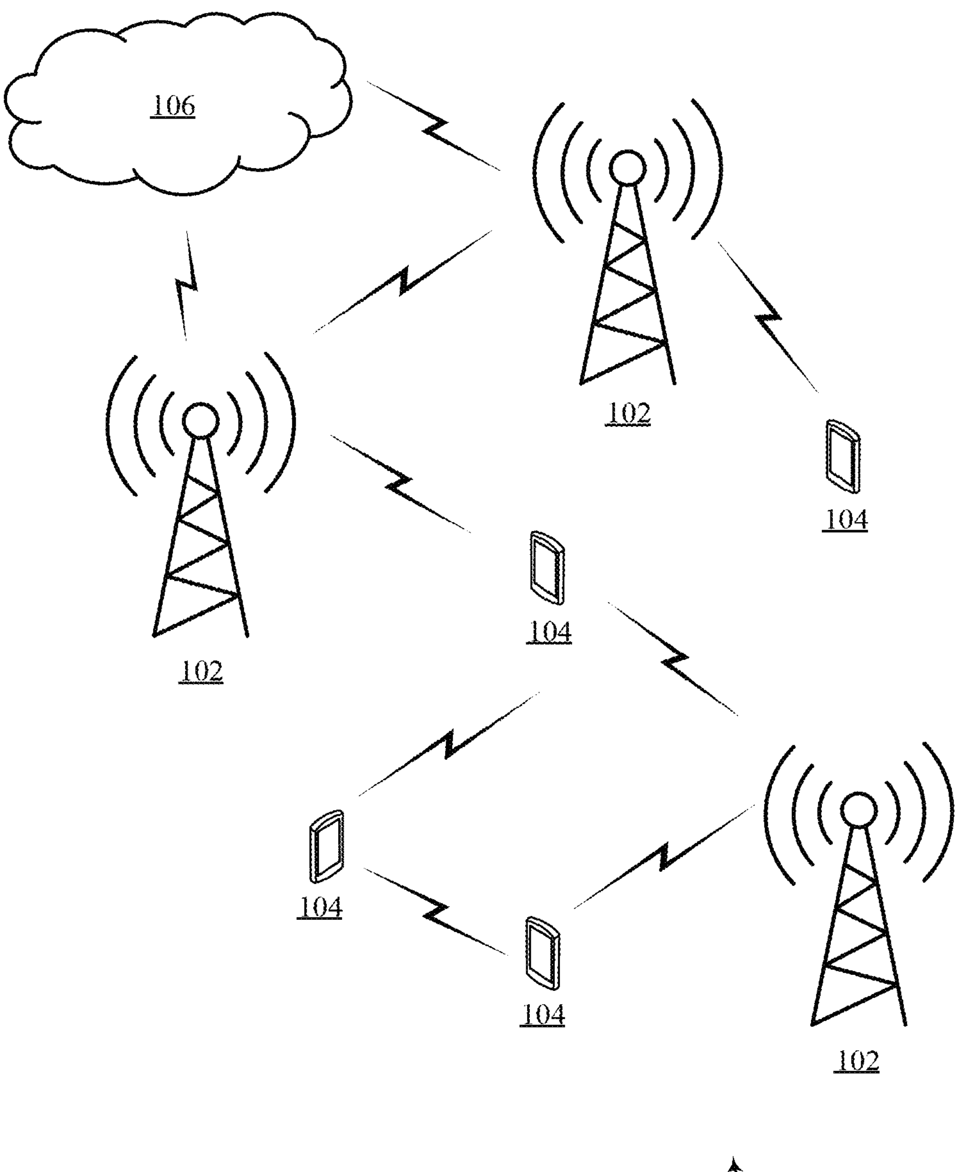
FIG. 1 illustrates an example of a wireless communications system in accordance with aspects of the present disclosure.

A wireless communication system may include one or more AIoT devices, which may be a passive-IoT device or a passive radio frequency identification (RFID) tag (e.g., sticker, tag, badge, patch, or the like) that supports one or more functionalities at lower cost and maintenance compared to other devices. For example, an AIoT device may harvest and store energy from an environment, such as one or more of solar (e.g., via photovoltaic energy harvesting), vibration (e.g., via piezoelectric, electrostatic, or electromagnetic energy harvesting), thermal (e.g., via thermoelectric energy harvesting), or radio waves, such as radio frequency (e.g., via signals received through an antenna of the AIoT device). The AIoT device may perform one or more operations (e.g., transmission, reception, via backscattering) using the stored harvested energy. For example, the AIoT device may be a passive RFID tag equipped on an object or other device enabling for tracking of a location of the object or the other device using stored harvested energy.

An AIoT device may be classified according to one or more categories. A first category AIoT device may lack both energy harvesting capabilities and communication capabilities. As such, the first category AIoT device may be considered a passive device and be exclusively capable of performing backscattering operations (e.g., backscattering transmissions). A second category AIoT device may support energy harvesting capabilities but lack communication capabilities. As such, the second category AIoT device may be considered a semi-passive device and be exclusively capable of performing backscattering operations (e.g., backscattering transmissions). However, in some cases, because the second category AIoT device supports energy harvesting capabilities, the second category AIoT device may be capable of amplifying reflected signals using stored harvested energy. A third category AIoT device may be considered an active device and support both energy harvesting and communication capabilities. In this example, the third category AIoT device may be equipped with an active radio frequency circuitry to support active communication (e.g., transmission, reception of signals).

In some cases, the wireless communications system may implement various topologies and deployment scenarios, such as one example topology in which a NE (e.g., a base station or other network entity) functions as a reader and a source of a carrier wave (e.g., for exciting an AIoT device to perform backscattering), another example topology in which the NE functions as the reader and a different device (e.g., a UE or other intermediate node) functions as the source of the carrier wave (e.g., an emitter node), another example topology in which the NE controls operations and other network entities (e.g., nodes) function as readers and/or carrier wave sources, and so on.

In some embodiments, the utilization of NOMA by AIoT devices may enable certain advantages when deploying AIoT devices, such as spectral efficiency by serving several devices using a single frequency resource, enhanced connectivity, lowered latency of data transmissions, and so on. However, AIoT devices, having low peak power consumption, may realize various transmission timing errors caused by, for example, a large sampling frequency offset (SFO) and/or a large carrier frequency offset (CFO), when attempting to utilize NOMA schemes. In some cases, such as during synchronous transmission schemes, PDRCH transmissions may include preambles, postambles, and/or midambles (e.g., for long PDRCH) to address the timing errors (e.g., errors due to a large SFO). However, AIoT devices lack sufficient capabilities to employ NOMA without inefficiencies, since NOMA requires the reception of multiple signals (from multiple AIoT devices) at the same time, which are detected at the symbol level.

The present disclosure introduces a NOMA mechanism for AIoT devices, mitigating and/or preventing the asynchronous transmissions effects of AIoT devices on multi-user detection during NOMA (or OMA, such as frequency division multiplex access (FDMA)). The NOMA mechanism, considering the ultra-low power consumption and ultra-low complexity of AIoT devices, facilitates the simultaneous and non-orthogonal transmission of different transport blocks (TBs) between AIoT devices to a reader device (e.g., a UE or NE), such as when there is no symbol-level synchronization between the devices. For example, each AIoT device of a group of AIoT devices (e.g., a group of AIoT devices associated with a reader device) may append to transmitted data (e.g., PDRCH) one or more prefixes at the start of one or more chips within the PDRCH. In some cases, an associated NE (e.g., a base station) may determine a length or duration of the prefix (or prefixes). In doing so, the NOMA mechanism enables the AIoT devices to utilize NOMA when transmitting data by mitigation timing errors (e.g., SFO, CFO), realizing the benefits of NOMA (e.g., spectral efficiency, low latency) without the drawbacks of deployment due to the low power devices.

Aspects of the present disclosure are described in the context of a wireless communications system.

FIG. 1 illustrates an example of a wireless communications system 100 in accordance with aspects of the present disclosure. The wireless communications system 100 may include one or more NE 102, one or more UE 104, and a core network (CN) 106. The wireless communications system 100 may support various radio access technologies. In some implementations, the wireless communications system 100 may be a 4G network, such as an LTE network or an LTE-Advanced (LTE-A) network. In some other implementations, the wireless communications system 100 may be a NR network, such as a 5G network, a 5G-Advanced (5G-A) network, or a 5G ultrawideband (5G-UWB) network. In other implementations, the wireless communications system 100 may be a combination of a 4G network and a 5G network, or other suitable radio access technology including Institute of Electrical and Electronics Engineers (IEEE) 802.11 (Wi-Fi), IEEE 802.16 (WiMAX), IEEE 802.20. The wireless communications system 100 may support radio access technologies beyond 5G, for example, 6G. Additionally, the wireless communications system 100 may support technologies, such as time division multiple access (TDMA), frequency division multiple access (FDMA), or code division multiple access (CDMA), etc.

The one or more NE 102 may be dispersed throughout a geographic region to form the wireless communications system 100. One or more of the NE 102 described herein may be or include or may be referred to as a network node, a base station, a network element, a network function, a network entity, a radio access network (RAN), a NodeB, an eNodeB (eNB), a next-generation NodeB (gNB), or other suitable terminology. An NE 102 and a UE 104 may communicate via a communication link, which may be a wireless or wired connection. For example, an NE 102 and a UE 104 may perform wireless communication (e.g., receive signaling, transmit signaling) over a Uu interface.

An NE 102 may provide a geographic coverage area for which the NE 102 may support services for one or more UEs 104 within the geographic coverage area. For example, an NE 102 and a UE 104 may support wireless communication of signals related to services (e.g., voice, video, packet data, messaging, broadcast, etc.) according to one or multiple radio access technologies. In some implementations, an NE 102 may be moveable, for example, a satellite associated with a non-terrestrial network (NTN). In some implementations, different geographic coverage areas associated with the same or different radio access technologies may overlap, but the different geographic coverage areas may be associated with different NE 102.

The one or more UE 104 may be dispersed throughout a geographic region of the wireless communications system 100. A UE 104 may include or may be referred to as a remote unit, a mobile device, a wireless device, a remote device, a subscriber device, a transmitter device, a receiver device, or some other suitable terminology. In some implementations, the UE 104 may be referred to as a unit, a station, a terminal, or a client, among other examples. Additionally, or alternatively, the UE 104 may be referred to as an Internet-of-Things (IoT) device, an Internet-of-Everything (IoE) device, or machine-type communication (MTC) device, among other examples.

A UE 104 may be able to support wireless communication directly with other UEs 104 over a communication link. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link may be referred to as a sidelink. For example, a UE 104 may support wireless communication directly with another UE 104 over a PC5 interface.

An NE 102 may support communications with the CN 106, or with another NE 102, or both. For example, an NE 102 may interface with other NE 102 or the CN 106 through one or more backhaul links (e.g., S1, N2, N2, or network interface). In some implementations, the NE 102 may communicate with each other directly. In some other implementations, the NE 102 may communicate with each other or indirectly (e.g., via the CN 106. In some implementations, one or more NE 102 may include subcomponents, such as an access network entity, which may be an example of an access node controller (ANC). An ANC may communicate with the one or more UEs 104 through one or more other access network transmission entities, which may be referred to as a radio heads, smart radio heads, or transmission-reception points (TRPs).

The CN 106 may support user authentication, access authorization, tracking, connectivity, and other access, routing, or mobility functions. The CN 106 may be an evolved packet core (EPC), or a 5G core (5GC), which may include a control plane entity that manages access and mobility (e.g., a mobility management entity (MME), an access and mobility management functions (AMF)) and a user plane entity that routes packets or interconnects to external networks (e.g., a serving gateway (S-GW), a Packet Data Network (PDN) gateway (P-GW), or a user plane function (UPF)). In some implementations, the control plane entity may manage non-access stratum (NAS) functions, such as mobility, authentication, and bearer management (e.g., data bearers, signal bearers, etc.) for the one or more UEs 104 served by the one or more NE 102 associated with the CN 106.

The CN 106 may communicate with a packet data network over one or more backhaul links (e.g., via an S1, N2, N2, or another network interface). The packet data network may include an application server. In some implementations, one or more UEs 104 may communicate with the application server. A UE 104 may establish a session (e.g., a protocol data unit (PDU) session, or the like) with the CN 106 via an NE 102. The CN 106 may route traffic (e.g., control information, data, and the like) between the UE 104 and the application server using the established session (e.g., the established PDU session). The PDU session may be an example of a logical connection between the UE 104 and the CN 106 (e.g., one or more network functions of the CN 106).

In the wireless communications system 100, the NEs 102 and the UEs 104 may use resources of the wireless communications system 100 (e.g., time resources (e.g., symbols, slots, subframes, frames, or the like) or frequency resources (e.g., subcarriers, carriers)) to perform various operations (e.g., wireless communications). In some implementations, the NEs 102 and the UEs 104 may support different resource structures. For example, the NEs 102 and the UEs 104 may support different frame structures. In some implementations, such as in 4G, the NEs 102 and the UEs 104 may support a single frame structure. In some other implementations, such as in 5G and among other suitable radio access technologies, the NEs 102 and the UEs 104 may support various frame structures (i.e., multiple frame structures). The NEs 102 and the UEs 104 may support various frame structures based on one or more numerologies.

One or more numerologies may be supported in the wireless communications system 100, and a numerology may include a subcarrier spacing and a cyclic prefix. A first numerology (e.g., $\mu=0$) may be associated with a first subcarrier spacing (e.g., 15 kHz) and a normal cyclic prefix. In some implementations, the first numerology (e.g., $\mu=0$) associated with the first subcarrier spacing (e.g., 15 kHz) may utilize one slot per subframe. A second numerology (e.g., $\mu=1$) may be associated with a second subcarrier spacing (e.g., 30 kHz) and a normal cyclic prefix. A third numerology (e.g., $\mu=2$) may be associated with a third subcarrier spacing (e.g., 60 kHz) and a normal cyclic prefix or an extended cyclic prefix. A fourth numerology (e.g., $\mu=3$) may be associated with a fourth subcarrier spacing (e.g., 120 kHz) and a normal cyclic prefix. A fifth numerology (e.g., $\mu=4$) may be associated with a fifth subcarrier spacing (e.g., 240 kHz) and a normal cyclic prefix.

A time interval of a resource (e.g., a communication resource) may be organized according to frames (also referred to as radio frames). Each frame may have a duration, for example, a 10 millisecond (ms) duration. In some implementations, each frame may include multiple subframes. For example, each frame may include 10 subframes, and each subframe may have a duration, for example, a 1 ms duration. In some implementations, each frame may have the same duration. In some implementations, each subframe of a frame may have the same duration.

Additionally or alternatively, a time interval of a resource (e.g., a communication resource) may be organized according to slots. For example, a subframe may include a number (e.g., quantity) of slots. The number of slots in each subframe may also depend on the one or more numerologies supported in the wireless communications system 100. For instance, the first, second, third, fourth, and fifth numerologies (i.e., $\mu=0, \mu=1, \mu=2, \mu=3, \mu=4$) associated with respective subcarrier spacings of 15 kHz, 30 kHz, 60 kHz, 120 kHz, and 240 kHz may utilize a single slot per subframe, two slots per subframe, four slots per subframe, eight slots per subframe, and 16 slots per subframe, respectively. Each slot may include a number (e.g., quantity) of symbols (e.g., OFDM symbols). In some implementations, the number (e.g., quantity) of slots for a subframe may depend on a numerology. For a normal cyclic prefix, a slot may include 14 symbols. For an extended cyclic prefix (e.g., applicable for 60 kHz subcarrier spacing), a slot may include 12 symbols. The relationship between the number of symbols per slot, the number of slots per subframe, and the number of slots per frame for a normal cyclic prefix and an extended cyclic prefix may depend on a numerology. It should be understood that reference to a first numerology (e.g., $\mu=0$) associated with a first subcarrier spacing (e.g., 15 kHz) may be used interchangeably between subframes and slots.

In the wireless communications system 100, an electromagnetic (EM) spectrum may be split, based on frequency or wavelength, into various classes, frequency bands, frequency channels, etc. By way of example, the wireless communications system 100 may support one or multiple operating frequency bands, such as frequency range designations FR1 (410 MHz-7.125 GHz), FR2 (24.25 GHz-52.6 GHz), FR3 (7.125 GHz-24.25 GHz), FR4 (52.6 GHz-114.25 GHz), FR4a or FR4-1 (52.6 GHz-71 GHz), and FR5 (114.25 GHz-300 GHz). In some implementations, the NEs 102 and the UEs 104 may perform wireless communications over one or more of the operating frequency bands. In some implementations, FR1 may be used by the NEs 102 and the UEs 104, among other equipment or devices for cellular communications traffic (e.g., control information, data). In some implementations, FR2 may be used by the NEs 102 and the UEs 104, among other equipment or devices for short-range, high data rate capabilities.

FR1 may be associated with one or multiple numerologies (e.g., at least three numerologies). For example, FR1 may be associated with a first numerology (e.g., $\mu=0$), which includes 15 kHz subcarrier spacing; a second numerology (e.g., $\mu=1$), which includes 30 kHz subcarrier spacing; and a third numerology (e.g., $\mu=2$), which includes 60 kHz subcarrier spacing. FR2 may be associated with one or multiple numerologies (e.g., at least 2 numerologies). For example, FR2 may be associated with a third numerology (e.g., $\mu=2$), which includes 60 kHz subcarrier spacing; and a fourth numerology (e.g., $\mu=3$), which includes 120 kHz subcarrier spacing.

The wireless communications system 100 may support managing (e.g., controlling, configuring) operation of IoT devices (e.g., which may be example of the UE 104), such as ambient IoT devices. As described herein, an AIoT device may be associated with a low complexity profile (e.g., low power consumption, less capabilities). Unlike other IoT devices defined by 3rd Generation Partnership Project (3GPP), ambient power-enabled devices may exclude a universal subscriber identity module (USIM), and thus may lack components (e.g., circuitry) that can apply security to communications to/from the devices and/or perform signal generation and transmissions.

Figure 2:
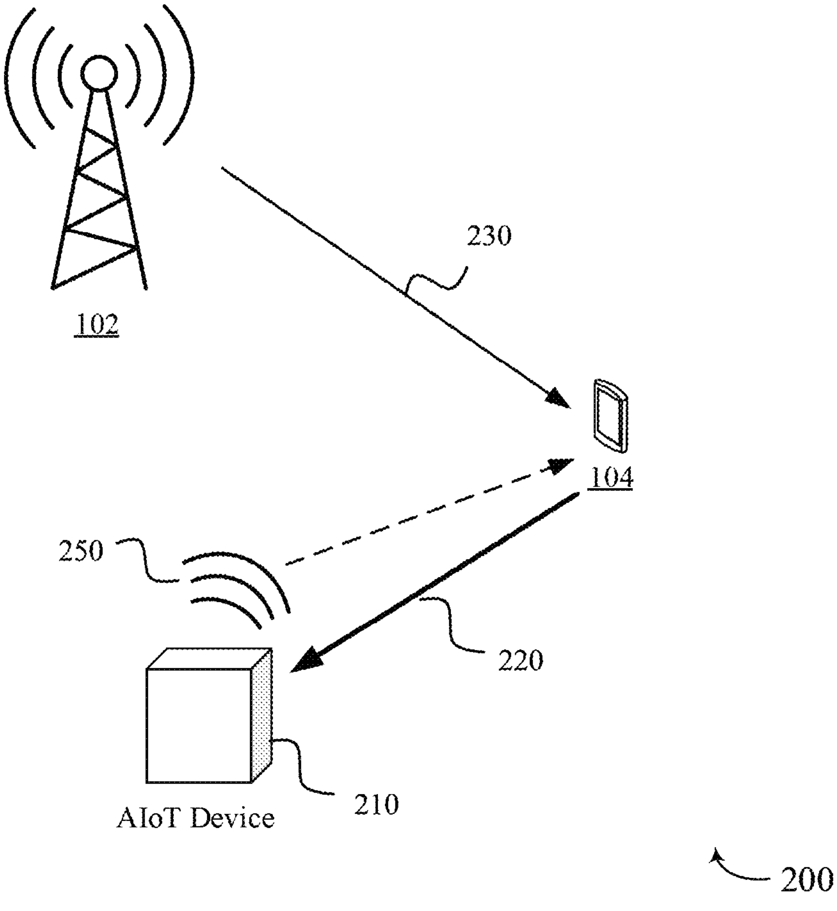
FIG. 2 illustrates an example topology of an AIoT device and receiver device in accordance with aspects of the present disclosure.

FIG. 2 illustrates an example topology 200 of an AIoT device and receiver device in accordance with aspects of the present disclosure. The topology 200 includes a NE 102 (e.g., a base station), a UE 104 (e.g., acting as an emitter node and/or reader device), and an AIoT device 210. The NE 102 and the UE 104 may be examples of NE 102 and UE 104 as described with reference to FIG. 1. In the example of FIG. 2, the UE 104 may transmit one or more carrier waves 220 to the AIoT device 210, which excite the AIoT device 210, enabling or causing the AIoT device 210 to perform one or more backscattering transmissions 250, which the UE 104 may receive (e.g., decoded, read) from the AIoT device 210. In this example, the UE 104 may be configured to or operable to function (e.g., operate) as a reader node (also referred to as a reader device herein).

While the topology 200 illustrates one deployment of the AIoT device 210, other deployments are possible. In some examples, the NE 102 may be configured to or operable to function (e.g., operate) as an emitter node (also referred to as a emitter device herein) and the reader (or receiver) node. In some other examples, the UE 104 may be configured to or operable to function (e.g., operate) as an emitter node and the NE 102 may be configured to or operable to function (e.g., operate) as a reader (or receiver) node. In other examples, another NE 102 may be configured to or operable to function (e.g., operate) as an intermediate node (e.g., an emitter node).

As described herein, the present disclosure enables the utilization of NOMA by AIoT devices, such as the AIoT device 210. For example, the AIoT device 210 may append a prefix to one or more groups of chips for transmission over a PDRCH to a reader device, such as the UE 104. The reader device (e.g., the UE 104) may use the appended prefix to efficiently perform detection and decoding of the received transmission over the PDRCH from the AIoT device when receiving multiple transmissions over the PDRCH from multiple AIoT devices.

In some embodiments, the prefix is or represents a buffer region or a guard interval at a beginning of data symbols to combat, mitigate, and/or prevent inter-symbol interference due to synchronization errors within the AIoT devices (e.g., SFO and CFO). In some cases, a duration ($T_P$,) of the prefix may correspond with or be based on a highest timing offset/delay among a group of AIoT devices (e.g., without considering any propagation delays).

The NE 102 (e.g., a base station) may signal or configure the AIoT devices, such as the AIoT device 102 with a configuration (also referred to as a prefix configuration herein), for example, before performing an SFO and/or CFO estimation procedure for the AIoT devices. The configuration may include a group identifier for the group of AIoT devices, a number of devices for a group, a window of the prefix (e.g., a time period when the prefix is valid), a duration or length of the prefix, and so on. In some cases, the NE 102 may utilize a medium access control-control element (MAC-CE), PRDCH, or other control channels (e.g., physical downlink control channel (PDCCH)) when signaling the AIoT devices with the configuration.

The reader device (e.g., the UE 104) may receive superposed (e.g., combination of) simultaneous transmissions over PDRCH by multiple AIoT devices, including the AIoT device 210 of a group of AIoT devices. The reader device (e.g., the UE 104) removes (e.g., discards) the appended prefix or prefixes before performing any multi-user detection operations. Thus, despite the low-energy consumption and reduced complexity, AIoT devices may share time and frequency resources (e.g., via NOMA, OMA, and so on) to perform simultaneous transmissions (e.g., transmission of transport blocks) over shared resources (e.g., non-orthogonal resources), despite not having synchronization between the AIoT devices.

Figure 3A:
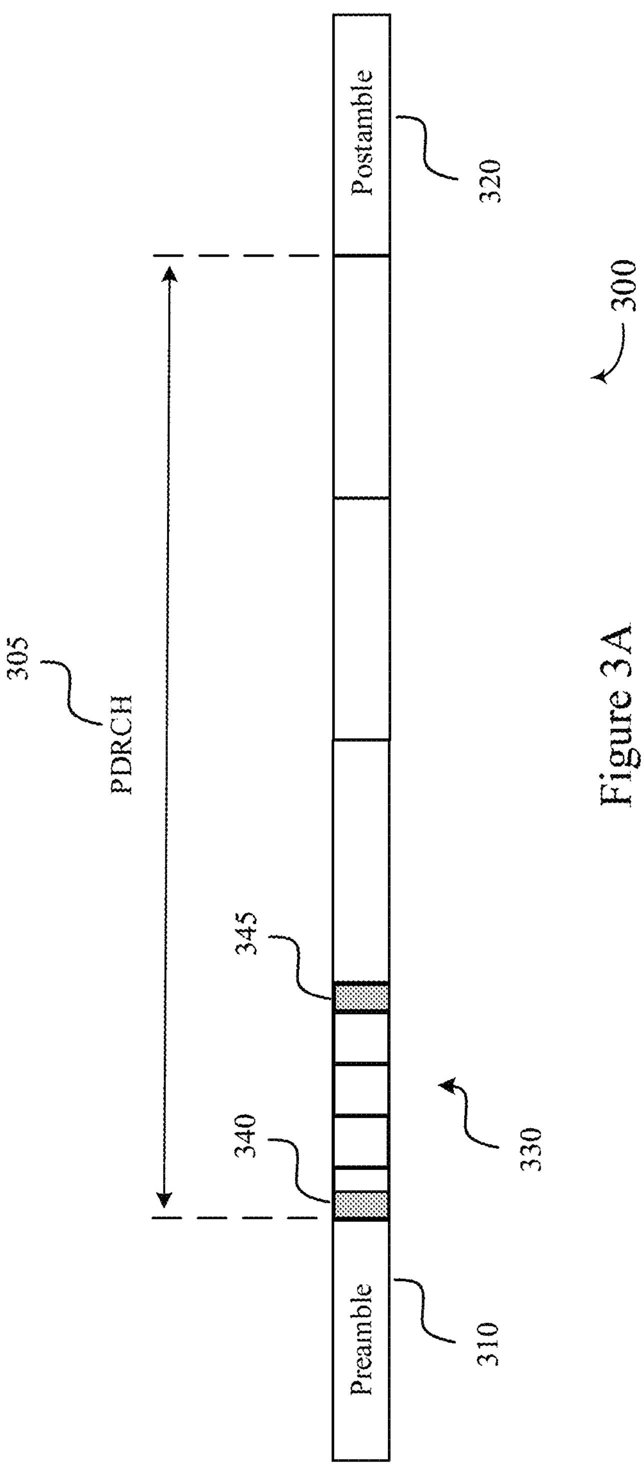
FIGS. 3A-3B illustrates example diagrams depicting configurations of reader-to-device (R2D) transmissions in accordance with aspects of the present disclosure.
Figure 3B:
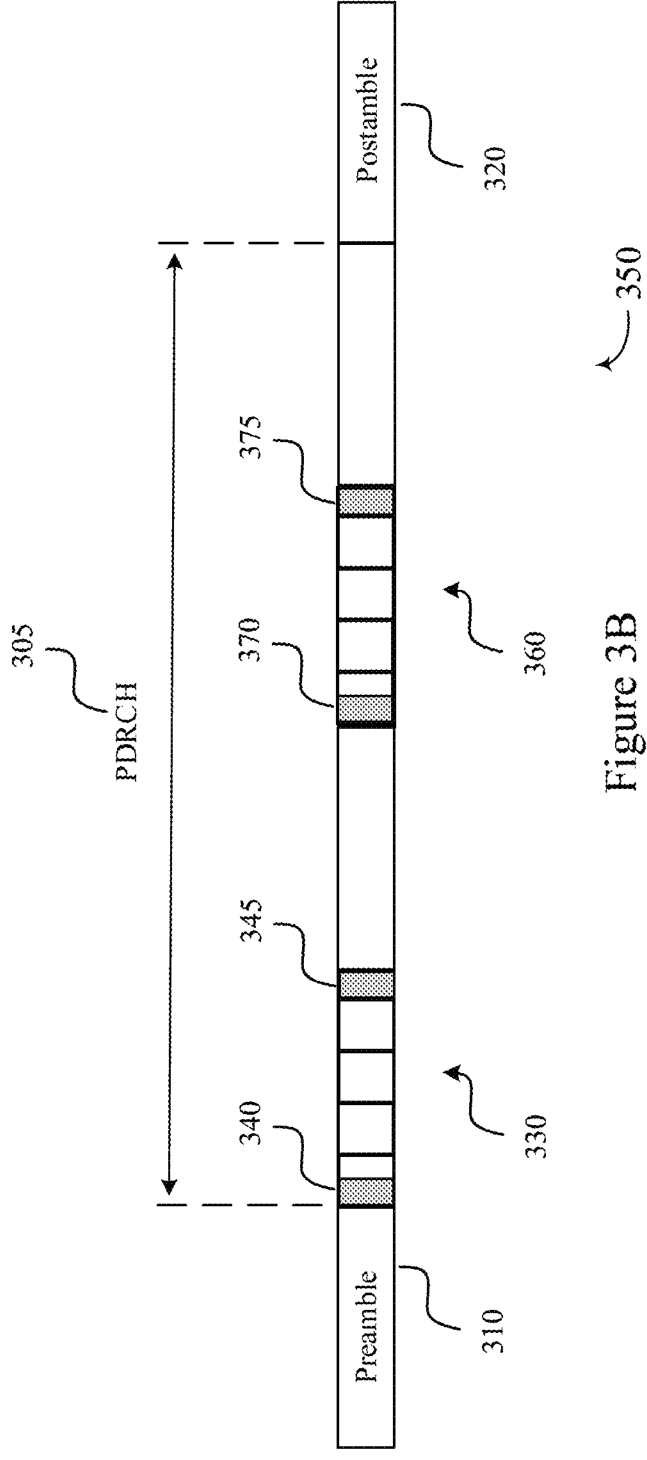

FIGS. 3A and 3B illustrate example diagrams depicting configurations of device-to-reader (D2R) transmissions in accordance with aspects of the present disclosure. With reference to FIG. 3A, an AIoT device may perform a transmission 300 (also referred to as a D2R transmission) to a reader device. The AIoT device and the reader device may be examples of devices described herein with reference to FIGS. 1 and 2. The transmission 300 may include a PDRCH 305 (e.g., D2R data traffic), a preamble 310 that indicates a starting time for the PDRCH 305 (and an SFO estimate) located at the beginning of the transmission 300 and before the PDRCH 305, and a postamble 320 located after the PDRCH 305 and indicating an end of the PDRCH 305.

The transmission 300 may include a time acquisition signal (e.g., indicating a starting time of the PDRCH 305 and/or chip length information), and, when the transmission 300 is a long packet (e.g., two or more PDRCHs), one or more midables, which may be inserted by the AIoT device to track chip-level timing and/or perform channel/interference estimation.

The AIoT device may append multiple prefixes to a group of chips. For example, the transmission 300 may include multiple prefixes 340, 345 appended by the AIoT device to a group of chips 330. A chip length, or chip, is a basic time unit for AIoT devices (e.g., akin to slots or frames). For AIoT D2R transmissions, a smallest time unit for resource allocation may be an on-off keying (OOK) or a binary phase shift keying (BPSK) chip. In some cases, the chip length for single carrier OOK may be defined as 2/(double sideband transmission bandwidth). For example, a single sideband transmission bandwidth of 150 kHz has a corresponding chip length of 13.3 μs.

The prefixes 340, 345 may function as a buffer or guard interval, which enables the alignment of multiple superposed signals (e.g., multiple transmissions) received at a reader device. In some cases, the transmission 300 may include one prefix (e.g., the prefix 340) or multiple prefixes (e.g., the prefixes 340 and 345).

In some cases, a transmission may include prefixes appended to multiple groups of chips. With reference to FIG. 3B, an AIoT device may perform a transmission 350 (also referred to as a D2R transmission) to a reader device. The AIoT device and the reader device may be examples of devices described herein with reference to FIGS. 1 and 2. The transmission 350 may include a first group of chips (e.g., the group of chips 330) and a second group of chips (e.g., a group of chips 360). The AIoT device may append each group of chips with one or more prefixes. For example, the AIoT device may append the prefixes 340, 345 to the groups of chips 330 and append prefixes 370, 375 to the group of chips 360.

As described herein, a reader device (e.g., a UE 104) may detect superposed signals using multi-user detection algorithms or techniques (e.g., using an approximate message passing (AMP) algorithm). Such detection might be useful when all AIoT devices transmitting signals to the reader device are synchronized. However, AIoT devices may realize a large SFO (e.g., ~$10^5$ ppm, where a timing error is accumulated by 1 ms every 10 ms, or 1 slot).

Figure 4:
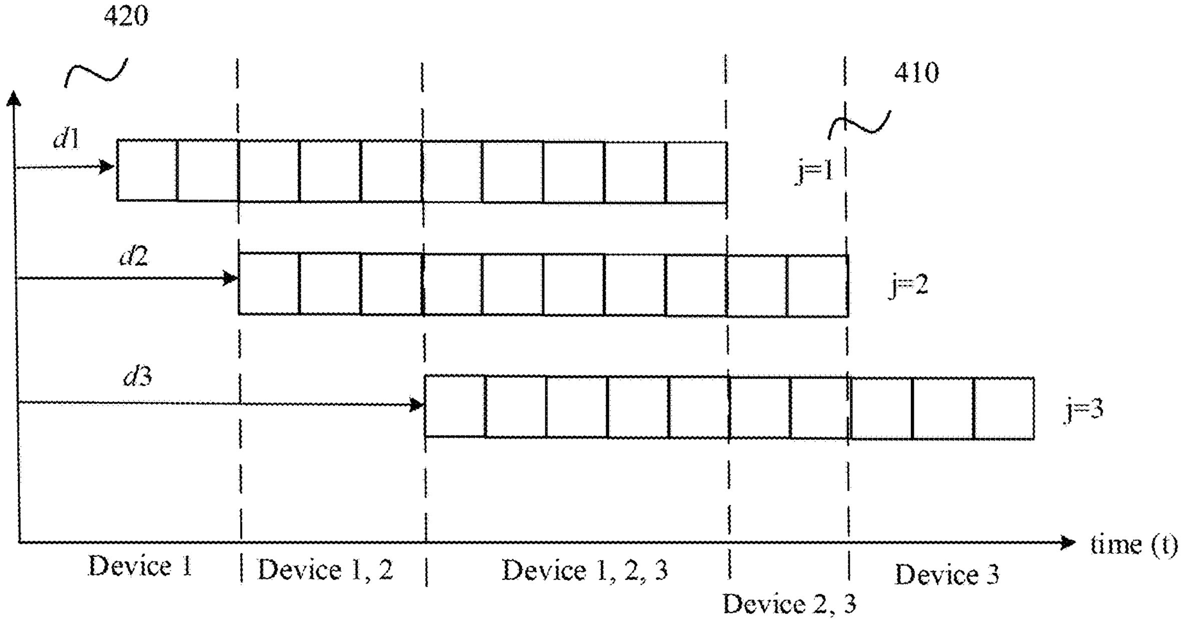
FIG. 4 illustrates an example of delayed signals in accordance with aspects of the present disclosure.

FIG. 4 illustrates an example of delayed signals 400 in accordance with aspects of the present disclosure, where three different signals 410 (e.g., represented by j=1, j=2, j=3) have different timing errors 420 (e.g., represented by d1, d2, d3) based on SFO and/or CFO.

In some embodiments, an AIoT device (e.g., an AIoT device 210 as described herein with reference to FIG. 2) appends a prefix to a time domain signal within a guard interval (e.g., within a group of chips). In some cases, the prefix may be a pseudo random sequence known by the AIoT device and a reader device (e.g., a NE 102, a UE 104).

In some cases, the prefix may correspond to a pre-defined/pre-configured sequence of on-off keying/amplitude-shift keying (OOK/ASK) symbols (e.g., with or without line coding, such as Manchester Coding). The sequence may have auto/cross correlation properties and be orthogonal at different AIoT devices. For example, the prefix may comprise an orthogonal sequence that is associated with auto-correlation properties or cross-correlation properties satisfying a criterion.

As described herein, the prefix sequences may be appended after a preamble (e.g., the preamble 310 of the transmission 300) and before a postamble (e.g., the postamble 320 of the transmission 300) of a transmission. In some cases, an AIoT device may append a prefix to each M number (e.g., quantity) of chips (e.g., to both groups of chips 330 and 360 in FIG. 3B, where M is equal to 2). In some cases, the M number of chips may be predefined/preconfigured, for example, by a NE 102.

In some cases, when the value of M is small (e.g., where M is configured based on one or more parameters, including SFO, CFO, PDRCH length, and so on), a reader device (e.g., a UE 104) may perform an efficient calibration, and thus improved multi-user detection and decoding. In some cases, the NE 102 (e.g., a base station) may determine a value for M and configure a group of AIoT devices with the value. For example, the value of M may be similar to all AIoT devices within a read range of a reader device (e.g., a UE 104) and/or be based on a length (e.g., size) of a PDRCH and determined or estimated SFO impacts to the AIoT devices. In some embodiments, a prefix duration may be based on a reception of data packets or chips once all prefixes are removed and the received data packets/chips are aligned in a time domain.

Figure 5:
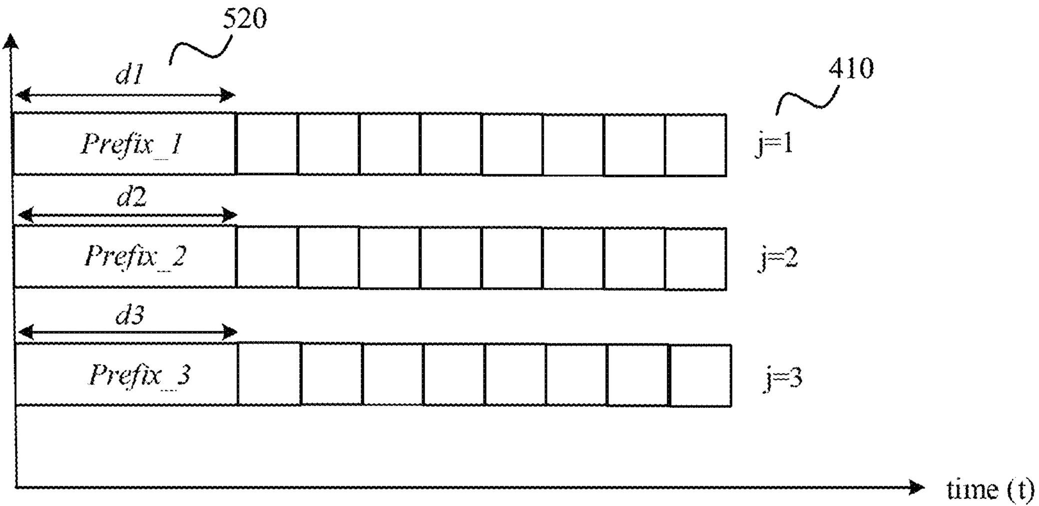
FIG. 5 illustrates an example of a signal alignment in accordance with aspects of the present disclosure.

FIG. 5 illustrates an example of a signal alignment 500 in accordance with aspects of the present disclosure. Prefixes 510, such as Prefix_1, Prefix_2, and Prefix_3, have different lengths, depending on timing errors (e.g., d1, d2, d3) for each of the signals 410 (e.g., j=1, j=2, j=3). A NE 102 (e.g., a base station) may estimate the lengths of the prefixes 510 (e.g., Prefix_1, Prefix_2, and Prefix_3) and signal (e.g., indicate) the lengths to AIoT devices associated with the signals 410 described in FIG. 4. In the example of FIG. 5, each of the prefixes 510 may have a length equal to the largest timing error for the AIoT devices.

Figure 6:
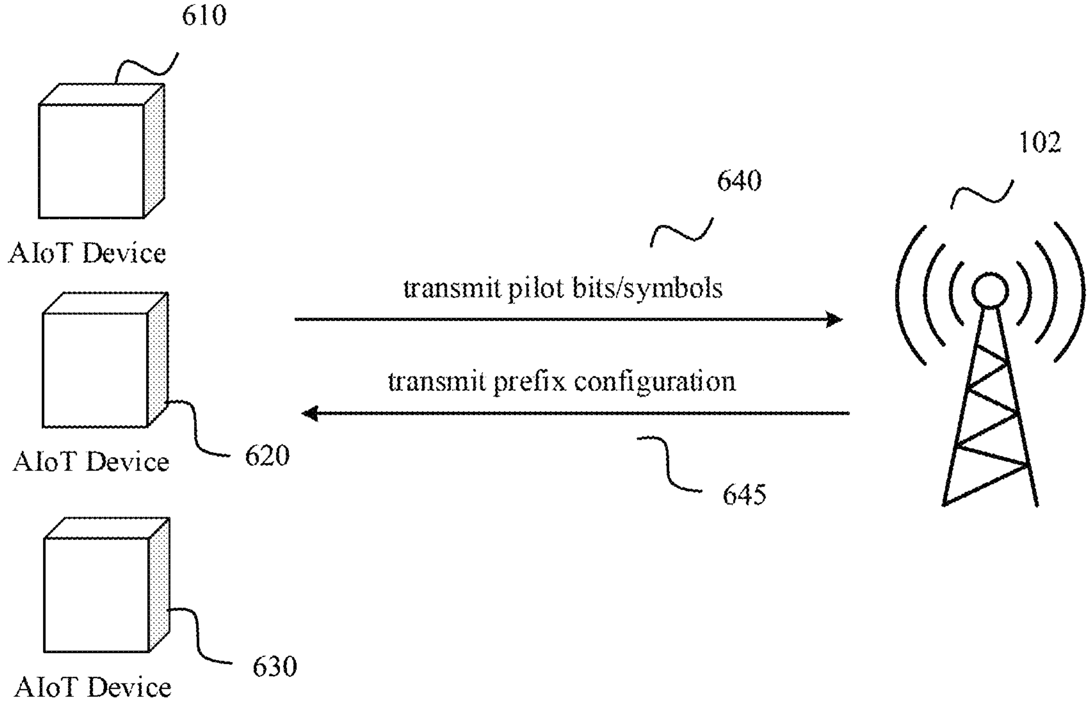
FIG. 6 illustrates an example of a procedure in accordance with aspects of the present disclosure.

FIG. 6 illustrates an example of a procedure 600 in accordance with aspects of the present disclosure. The procedure 600 may be implemented at or by a NE 102 and/or one or more AIoT devices 610, 620, 630 (also collectively referred to as a group of AIoT devices). The NE 102 and the AIoT devices 610, 620, 630 may be examples of NE and AIoT devices as described herein. In some examples, The AIoT devices 610, 620, 620, prior to performing a data transmission, may transmit certain symbols (e.g., training or pilot bits or symbols) 640, or repeat transmission of the bits or symbols 640, to the NE 102, which may receive the bits or symbols 640 and estimate or determine timing errors (e.g., SFO or CFO) at the AIoT devices 610, 620, 630. For example, the NE 102 may identify a phase difference between successive or repeated bits or symbols as the SFO and/or CFO at an AIoT device (e.g., the AIoT device 610).

In response to the CFO and/or SFO being determined, the NE 102 may select or determine a prefix duration that is equal to or longer than a highest estimated SFO/CFO induced timing error at one of the AIoT devices 610, 620, 630, and transmit a prefix configuration 645 to the AIoT devices 610, 620, 630. The prefix configuration 645 may indicate (e.g., identify) the determined prefix duration. In some cases, the prefix configuration 645 may include a trigger that causes the AIoT devices 610, 620, 630 to periodically transmit pilot symbols and/or to transmit pilot symbols in response to detecting asynchronous reception (e.g., synchronization errors, inefficient user detection, and so on).

The NE 102 may track the CFO and/or SFO at the AIoT devices 610, 620, 630 based on the periodic or trigged pilot symbol transmissions and transmit an updated configuration to modify prefix durations at the AIoT devices 610, 620, 630. For example, the NE 102 may append an updated prefix to the beginning of each data symbol/frame/TB.

Further, the prefix configuration 645 may include information associated with the estimation of the SFO/CFO, such as the estimation method, the training/pilot sequence, the estimation certainty levels (e.g., confidence level), group identifiers (e.g., identifying a group of AIoT devices that appended the same prefix), and so on.

In some cases, an inventory of devices (e.g., the group of AIoT devices 610, 620, 630) may include active, semi-passive, and/or passive IoT devices. The size of a PDRCH of each of the AIoT devices may be different, and a prefix sequence of the PDRCH of a first AIoT device may overlap with the prefix sequence of the PDRCH of a second AIoT device, where the PDRCH of the first AIoT device is larger than the PDRCH of the second AIoT device. In such a scenario, the multi-user detection algorithm of the reader device may consider the data of the first AIoT device as known data/sequence and either discard the data from the iterative detection or use it as known sequence.

In some cases, a PDRCH_1 of a first AIoT device may overlap with a PDRCH_2 of a second AIoT device, where the PDRCHs have different sizes. In such a scenario, the AIoT device may be configured to transmit the smaller PDRCH sizes after a certain delay. In some cases, all AIoT devices of a group of AIoT devices (e.g., all AIoT devices within a read range of a reader device) may transmit packets at pre-defined time slots to avoid collapse of two different PDRCHs.

In some embodiments, a NE 102 (e.g., a base station) may estimate a prefix length and signal a prefix configuration that includes the prefix length to the group of AIoT devices via Layer (L1) signaling (e.g., lower layer signaling) 1 or Layer 2 (L2) signaling (e.g., PRDCH and/or MAC-CE). L1 may be a physical (PHY) layer of a protocol stack of the NE 102, the UE 104, and/or the AIoT devices described herein. L2 may be a medium access control (MAC) layer, a radio link control (RLC) layer, and/or a packet data convergence protocol (PDCP) layer of a protocol stack of the NE 102, the UE 104, and/or the AIoT devices described herein. The prefix configuration may include the prefix duration, the group identifier, the window over which the prefix is valid, and/or other information.

Figure 7:
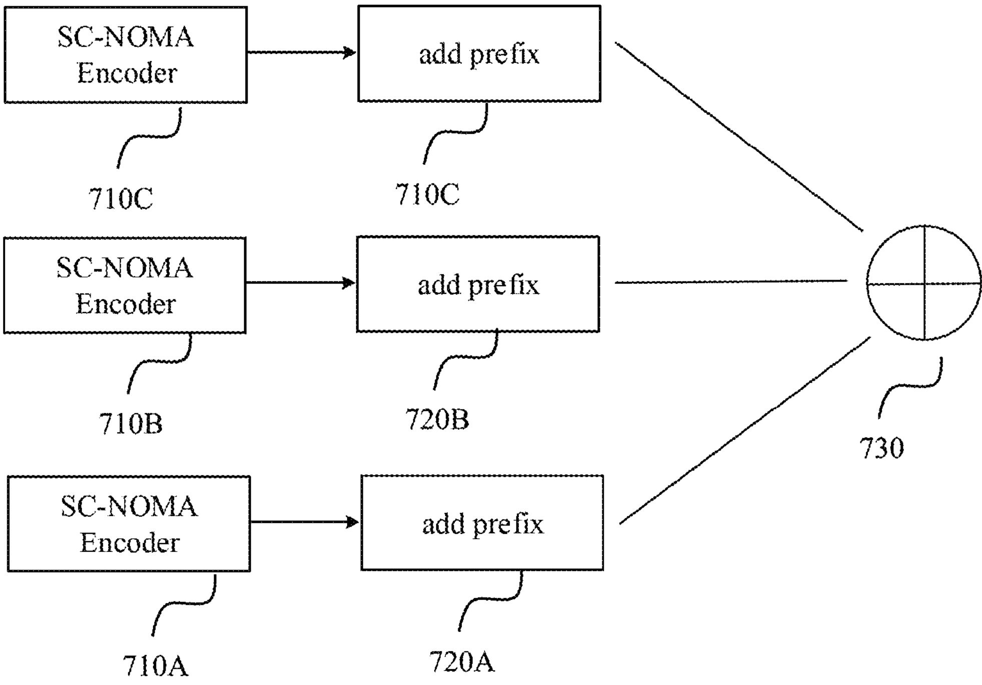
FIG. 7 illustrates an example of a device-to-reader transmission using NOMA in accordance with aspects of the present disclosure.

FIG. 7 illustrates an example of a device-to-reader transmission using NOMA 700 in accordance with aspects of the present disclosure. Each AIoT device of a group of AIoT devices may include (e.g., equipped with) an SC-NOMA encoder 710. For example, a first AIoT device may include an SC-NOMA encoder 710A, a second AIoT device may include an SC-NOMA encoder 710B, and a third AIoT device may include an SC-NOMA encoder 710C. Each of the SC-NOMA encoders A-C may be configured to or operable to append (e.g., add) a prefix 720 to a corresponding transmission (e.g., D2R transmissions) associated with a corresponding AIoT device using a NOMA transmission scheme. By way of example, the first AIoT device, including the SC-NOMA encoder 710A may append (e.g., add) a prefix 720A to a transmission (e.g., D2R transmission) by the first AIoT device using a NOMA transmission scheme. The second AIoT device, including the SC-NOMA encoder 710B may append (e.g., add) a prefix 720B to a transmission (e.g., D2R transmission) by the second AIoT device using the NOMA transmission scheme. The third AIoT device, including the SC-NOMA encoder 710C may append (e.g., add) a prefix 720C to a transmission (e.g., D2R transmission) by the third AIoT device using the NOMA transmission scheme.

The NOMA transmission scheme may support for each of the transmissions by the AIOT devices to be superposed resulting in superposed signals 730 at a reader device (e.g., a NE 102, a UE 104). The reader device may remove (e.g., discard) a prefix from each signal of the superposed signals 730 prior to performing a Fast Fourier Transform (FFT) and multi-user detection. The signals, after prefix extraction, may correspond to a set of synchronized signals without timing errors. Thus, multi-user detection algorithms employed by the reader device, such as the MAP (e.g., a Max-Log MAP) may efficiently detect and decode the signals from the AIoT devices.

Figure 8:
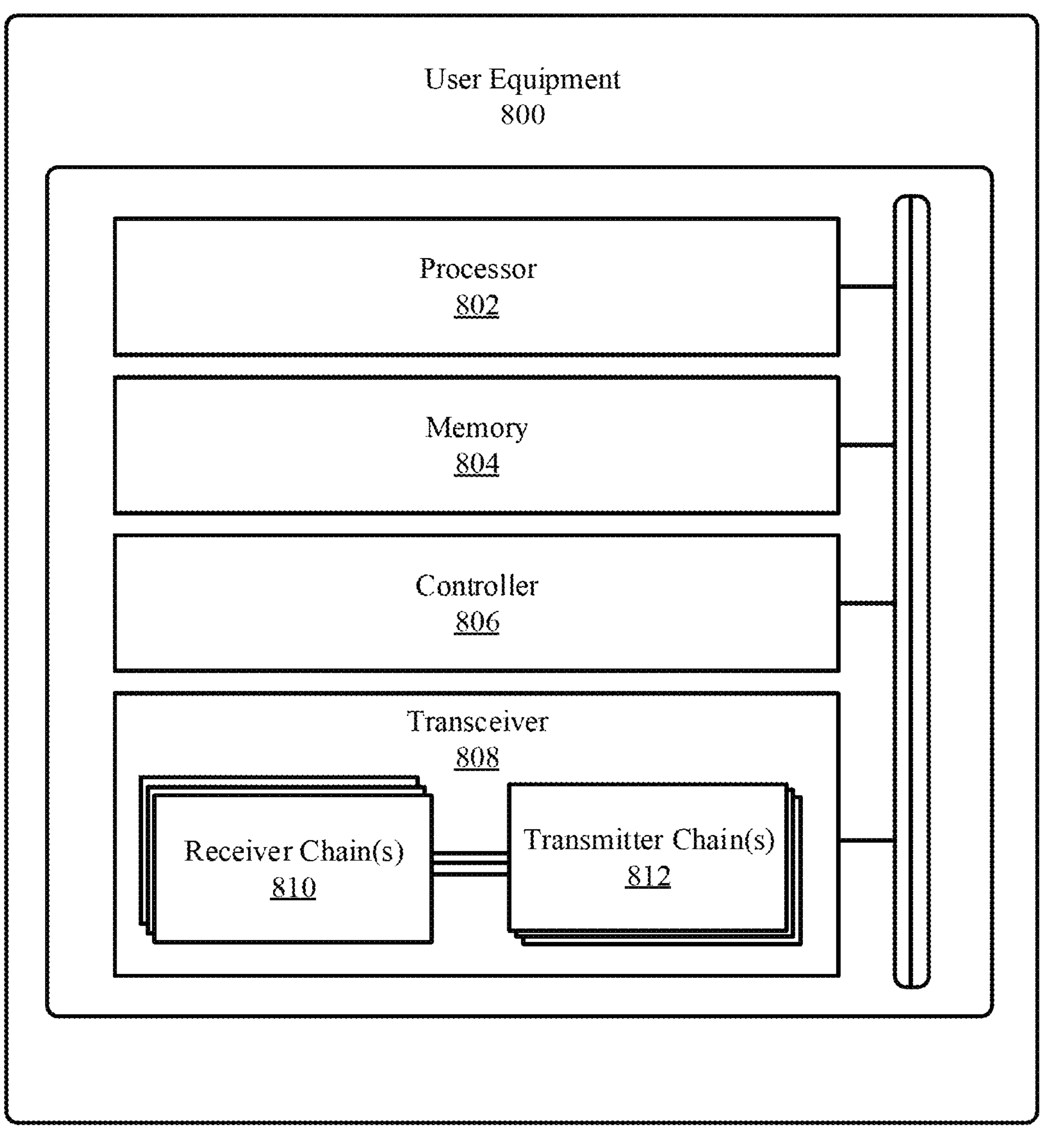
FIG. 8 illustrates an example of a UE in accordance with aspects of the present disclosure.

FIG. 8 illustrates an example of a UE 800 in accordance with aspects of the present disclosure. The UE 800 may include a processor 802, a memory 804, a controller 806, and a transceiver 808. The processor 802, the memory 804, the controller 806, or the transceiver 808, or various combinations thereof or various components thereof may be examples of means for performing various aspects of the present disclosure as described herein. These components may be coupled (e.g., operatively, communicatively, functionally, electronically, electrically) via one or more interfaces.

The processor 802, the memory 804, the controller 806, or the transceiver 808, or various combinations or components thereof may be implemented in hardware (e.g., circuitry). The hardware may include a processor, a digital signal processor (DSP), an application-specific integrated circuit (ASIC), or other programmable logic device, or any combination thereof configured as or otherwise supporting a means for performing the functions described in the present disclosure.

The processor 802 may include an intelligent hardware device (e.g., a general-purpose processor, a DSP, a CPU, an ASIC, an FPGA, or any combination thereof). In some implementations, the processor 802 may be configured to operate the memory 804. In some other implementations, the memory 804 may be integrated into the processor 802. The processor 802 may be configured to execute computer-readable instructions stored in the memory 804 to cause the UE 800 to perform various functions of the present disclosure.

The memory 804 may include volatile or non-volatile memory. The memory 804 may store computer-readable, computer-executable code including instructions when executed by the processor 802 cause the UE 800 to perform various functions described herein. The code may be stored in a non-transitory computer-readable medium such the memory 804 or another type of memory. Computer-readable media includes both non-transitory computer storage media and communication media including any medium that facilitates transfer of a computer program from one place to another. A non-transitory storage medium may be any available medium that may be accessed by a general-purpose or special-purpose computer.

In some implementations, the processor 802 and the memory 804 coupled with the processor 802 may be configured to cause the UE 800 to perform one or more of the functions described herein (e.g., executing, by the processor 802, instructions stored in the memory 804). For example, the processor 802 may support wireless communication at the UE 800 in accordance with examples as disclosed herein. The UE 800 may be configured to support a means for determining one or more groups of chips for transmission over a PDRCH, wherein the transmission comprises a preamble and a postamble, and wherein the one or more groups of chips for transmission over the PDRCH are located between the preamble and the postamble, appending a prefix to each group of chips of the one or more groups of chips, wherein the prefix is appended to a beginning chip of each group of chips, and performing the transmission on the PDRCH over one or non-orthogonal resources.

As another example, the UE 800, acting as a reader device, may be configured to support a means for receiving, via one or more non-orthogonal resources from multiple AIoT devices, multiple PDRCH signals superposed at the reader device, and performing a multi-user detection operation to detect and decode the received superposed PDRCH signals.

The controller 806 may manage input and output signals for the UE 800. The controller 806 may also manage peripherals not integrated into the UE 800. In some implementations, the controller 806 may utilize an operating system such as iOS®, ANDROID®, WINDOWS®, or other operating systems. In some implementations, the controller 806 may be implemented as part of the processor 802.

In some implementations, the UE 800 may include at least one transceiver 808. In some other implementations, the UE 800 may have more than one transceiver 808. The transceiver 808 may represent a wireless transceiver. The transceiver 808 may include one or more receiver chains 810, one or more transmitter chains 812, or a combination thereof.

A receiver chain 810 may be configured to receive signals (e.g., control information, data, packets) over a wireless medium. For example, the receiver chain 810 may include one or more antennas for receive the signal over the air or wireless medium. The receiver chain 810 may include at least one amplifier (e.g., a low-noise amplifier (LNA)) configured to amplify the received signal. The receiver chain 810 may include at least one demodulator configured to demodulate the receive signal and obtain the transmitted data by reversing the modulation technique applied during transmission of the signal. The receiver chain 810 may include at least one decoder for decoding the processing the demodulated signal to receive the transmitted data.

A transmitter chain 812 may be configured to generate and transmit signals (e.g., control information, data, packets). The transmitter chain 812 may include at least one modulator for modulating data onto a carrier signal, preparing the signal for transmission over a wireless medium. The at least one modulator may be configured to support one or more techniques such as amplitude modulation (AM), frequency modulation (FM), or digital modulation schemes like phase-shift keying (PSK) or quadrature amplitude modulation (QAM). The transmitter chain 812 may also include at least one power amplifier configured to amplify the modulated signal to an appropriate power level suitable for transmission over the wireless medium. The transmitter chain 812 may also include one or more antennas for transmitting the amplified signal into the air or wireless medium.

Figure 9:
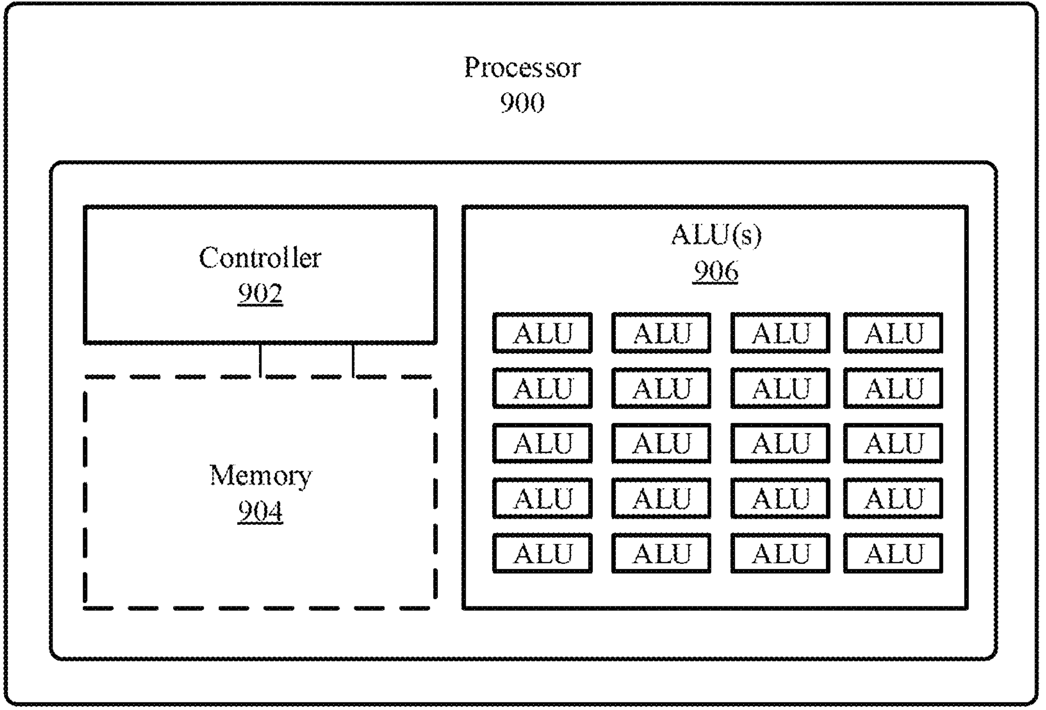
FIG. 9 illustrates an example of a processor in accordance with aspects of the present disclosure.

FIG. 9 illustrates an example of a processor 900 in accordance with aspects of the present disclosure. The processor 900 may be an example of a processor configured to perform various operations in accordance with examples as described herein. The processor 900 may include a controller 902 configured to perform various operations in accordance with examples as described herein. The processor 900 may optionally include at least one memory 904, which may be, for example, an L1/L2/L3 cache. Additionally, or alternatively, the processor 900 may optionally include one or more arithmetic-logic units (ALUs) 906. One or more of these components may be in electronic communication or otherwise coupled (e.g., operatively, communicatively, functionally, electronically, electrically) via one or more interfaces (e.g., buses).

The processor 900 may be a processor chipset and include a protocol stack (e.g., a software stack) executed by the processor chipset to perform various operations (e.g., receiving, obtaining, retrieving, transmitting, outputting, forwarding, storing, determining, identifying, accessing, writing, reading) in accordance with examples as described herein. The processor chipset may include one or more cores, one or more caches (e.g., memory local to or included in the processor chipset (e.g., the processor 900) or other memory (e.g., random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), and others).

The controller 902 may be configured to manage and coordinate various operations (e.g., signaling, receiving, obtaining, retrieving, transmitting, outputting, forwarding, storing, determining, identifying, accessing, writing, reading) of the processor 900 to cause the processor 900 to support various operations in accordance with examples as described herein. For example, the controller 902 may operate as a control unit of the processor 900, generating control signals that manage the operation of various components of the processor 900. These control signals include enabling or disabling functional units, selecting data paths, initiating memory access, and coordinating timing of operations.

The controller 902 may be configured to fetch (e.g., obtain, retrieve, receive) instructions from the memory 904 and determine subsequent instruction(s) to be executed to cause the processor 900 to support various operations in accordance with examples as described herein. The controller 902 may be configured to track memory address of instructions associated with the memory 904. The controller 902 may be configured to decode instructions to determine the operation to be performed and the operands involved. For example, the controller 902 may be configured to interpret the instruction and determine control signals to be output to other components of the processor 900 to cause the processor 900 to support various operations in accordance with examples as described herein. Additionally, or alternatively, the controller 902 may be configured to manage flow of data within the processor 900. The controller 902 may be configured to control transfer of data between registers, arithmetic logic units (ALUs), and other functional units of the processor 900.

The memory 904 may include one or more caches (e.g., memory local to or included in the processor 900 or other memory, such RAM, ROM, DRAM, SDRAM, SRAM, MRAM, flash memory, etc. In some implementations, the memory 904 may reside within or on a processor chipset (e.g., local to the processor 900). In some other implementations, the memory 904 may reside external to the processor chipset (e.g., remote to the processor 900).

The memory 904 may store computer-readable, computer-executable code including instructions that, when executed by the processor 900, cause the processor 900 to perform various functions described herein. The code may be stored in a non-transitory computer-readable medium such as system memory or another type of memory. The controller 902 and/or the processor 900 may be configured to execute computer-readable instructions stored in the memory 904 to cause the processor 900 to perform various functions. For example, the processor 900 and/or the controller 902 may be coupled with or to the memory 904, the processor 900, the controller 902, and the memory 904 may be configured to perform various functions described herein. In some examples, the processor 900 may include multiple processors and the memory 904 may include multiple memories. One or more of the multiple processors may be coupled with one or more of the multiple memories, which may, individually or collectively, be configured to perform various functions herein.

The one or more ALUs 906 may be configured to support various operations in accordance with examples as described herein. In some implementations, the one or more ALUs 906 may reside within or on a processor chipset (e.g., the processor 900). In some other implementations, the one or more ALUs 906 may reside external to the processor chipset (e.g., the processor 900). One or more ALUs 906 may perform one or more computations such as addition, subtraction, multiplication, and division on data. For example, one or more ALUs 906 may receive input operands and an operation code, which determines an operation to be executed. One or more ALUs 906 be configured with a variety of logical and arithmetic circuits, including adders, subtractors, shifters, and logic gates, to process and manipulate the data according to the operation. Additionally, or alternatively, the one or more ALUs 906 may support logical operations such as AND, OR, exclusive-OR (XOR), not-OR (NOR), and not-AND (NAND), enabling the one or more ALUs 906 to handle conditional operations, comparisons, and bitwise operations.

The processor 900 may support wireless communication in accordance with examples as disclosed herein. The UE processor 900 may be configured to support a means for determining one or more groups of chips for transmission over a PDRCH, wherein the transmission comprises a preamble and a postamble, and wherein the one or more groups of chips for transmission over the PDRCH are located between the preamble and the postamble, appending a prefix to each group of chips of the one or more groups of chips, wherein the prefix is appended to a beginning chip of each group of chips, and performing the transmission on the PDRCH over one or more non-orthogonal resources.

Figure 10:
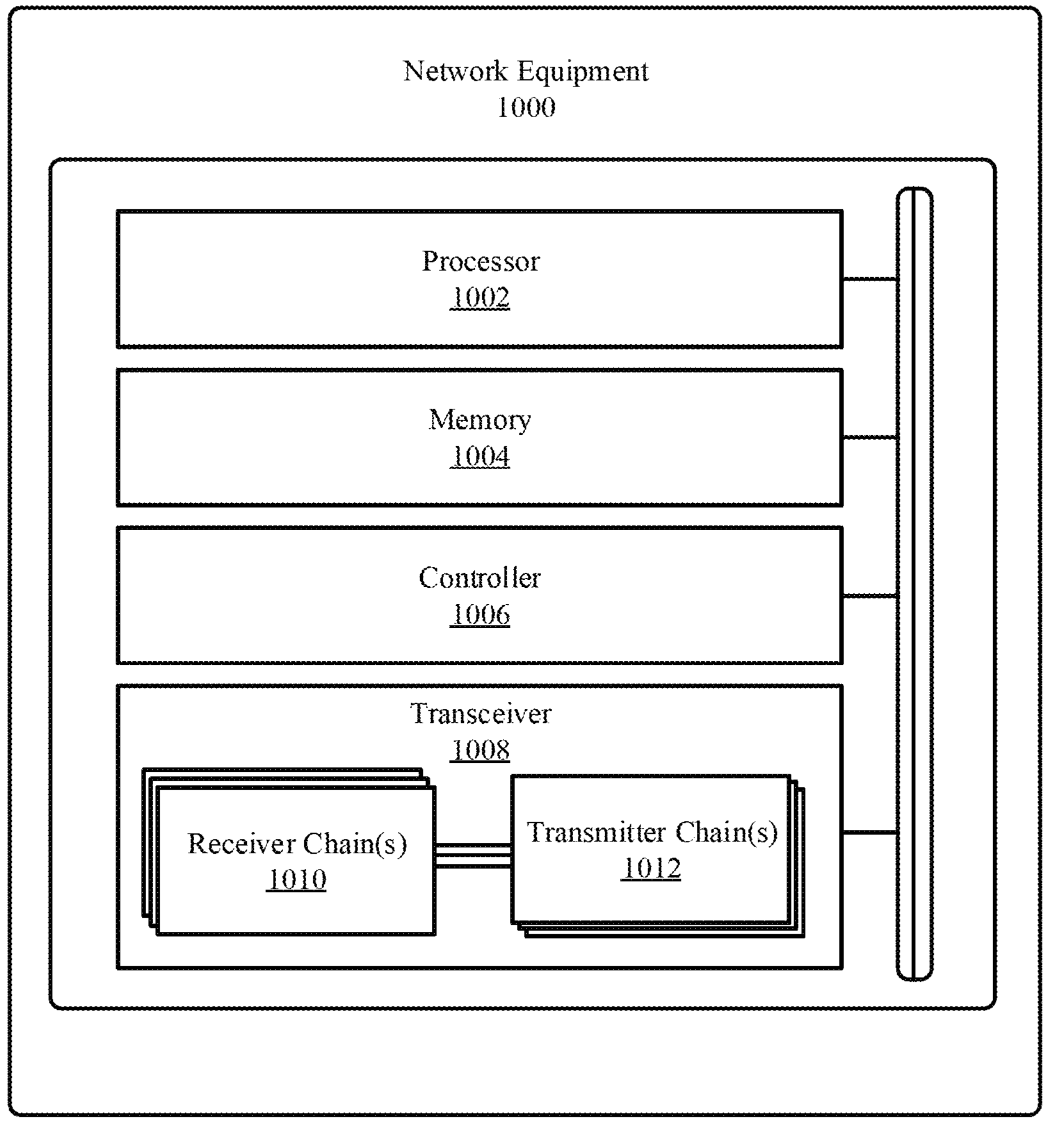
FIG. 10 illustrates an example of a network equipment (NE) in accordance with aspects of the present disclosure.

FIG. 10 illustrates an example of a NE 1000 in accordance with aspects of the present disclosure. The NE 1000 may include a processor 1002, a memory 1004, a controller 1006, and a transceiver 1008. The processor 1002, the memory 1004, the controller 1006, or the transceiver 1008, or various combinations thereof or various components thereof may be examples of means for performing various aspects of the present disclosure as described herein. These components may be coupled (e.g., operatively, communicatively, functionally, electronically, electrically) via one or more interfaces.

The processor 1002, the memory 1004, the controller 1006, or the transceiver 1008, or various combinations or components thereof may be implemented in hardware (e.g., circuitry). The hardware may include a processor, a digital signal processor (DSP), an application-specific integrated circuit (ASIC), or other programmable logic device, or any combination thereof configured as or otherwise supporting a means for performing the functions described in the present disclosure.

The processor 1002 may include an intelligent hardware device (e.g., a general-purpose processor, a DSP, a CPU, an ASIC, an FPGA, or any combination thereof). In some implementations, the processor 1002 may be configured to operate the memory 1004. In some other implementations, the memory 1004 may be integrated into the processor 1002. The processor 1002 may be configured to execute computer-readable instructions stored in the memory 1004 to cause the NE 1000 to perform various functions of the present disclosure.

The memory 1004 may include volatile or non-volatile memory. The memory 1004 may store computer-readable, computer-executable code including instructions when executed by the processor 1002 cause the NE 1000 to perform various functions described herein. The code may be stored in a non-transitory computer-readable medium such the memory 1004 or another type of memory. Computer-readable media includes both non-transitory computer storage media and communication media including any medium that facilitates transfer of a computer program from one place to another. A non-transitory storage medium may be any available medium that may be accessed by a general-purpose or special-purpose computer.

In some implementations, the processor 1002 and the memory 1004 coupled with the processor 1002 may be configured to cause the NE 1000 to perform one or more of the functions described herein (e.g., executing, by the processor 1002, instructions stored in the memory 1004). For example, the processor 1002 may support wireless communication at the NE 1000 in accordance with examples as disclosed herein. The NE 1000 may be configured to support a means for receiving pilot bits from a group of AIoT devices, estimating a timing error at each AIoT device of the group of AIoT devices, and transmitting a prefix configuration to the group of AIoT devices, wherein the prefix configuration includes: a group identifier for the group of AIoT devices, a quantity of chips to include in PDRCH transmissions, and a prefix duration for a prefix added to each PDRCH transmission, wherein the prefix duration is based on the estimated timing error.

The controller 1006 may manage input and output signals for the NE 1000. The controller 1006 may also manage peripherals not integrated into the NE 1000. In some implementations, the controller 1006 may utilize an operating system such as iOS®, ANDROID®, WINDOWS®, or other operating systems. In some implementations, the controller 1006 may be implemented as part of the processor 1002.

In some implementations, the NE 1000 may include at least one transceiver 1008. In some other implementations, the NE 1000 may have more than one transceiver 1008. The transceiver 1008 may represent a wireless transceiver. The transceiver 1008 may include one or more receiver chains 1010, one or more transmitter chains 1012, or a combination thereof.

A receiver chain 1010 may be configured to receive signals (e.g., control information, data, packets) over a wireless medium. For example, the receiver chain 1010 may include one or more antennas for receive the signal over the air or wireless medium. The receiver chain 1010 may include at least one amplifier (e.g., a low-noise amplifier (LNA)) configured to amplify the received signal. The receiver chain 1010 may include at least one demodulator configured to demodulate the receive signal and obtain the transmitted data by reversing the modulation technique applied during transmission of the signal. The receiver chain 1010 may include at least one decoder for decoding the processing the demodulated signal to receive the transmitted data.

A transmitter chain 1012 may be configured to generate and transmit signals (e.g., control information, data, packets). The transmitter chain 1012 may include at least one modulator for modulating data onto a carrier signal, preparing the signal for transmission over a wireless medium. The at least one modulator may be configured to support one or more techniques such as amplitude modulation (AM), frequency modulation (FM), or digital modulation schemes like phase-shift keying (PSK) or quadrature amplitude modulation (QAM). The transmitter chain 1012 may also include at least one power amplifier configured to amplify the modulated signal to an appropriate power level suitable for transmission over the wireless medium. The transmitter chain 1012 may also include one or more antennas for transmitting the amplified signal into the air or wireless medium.

Figure 11:
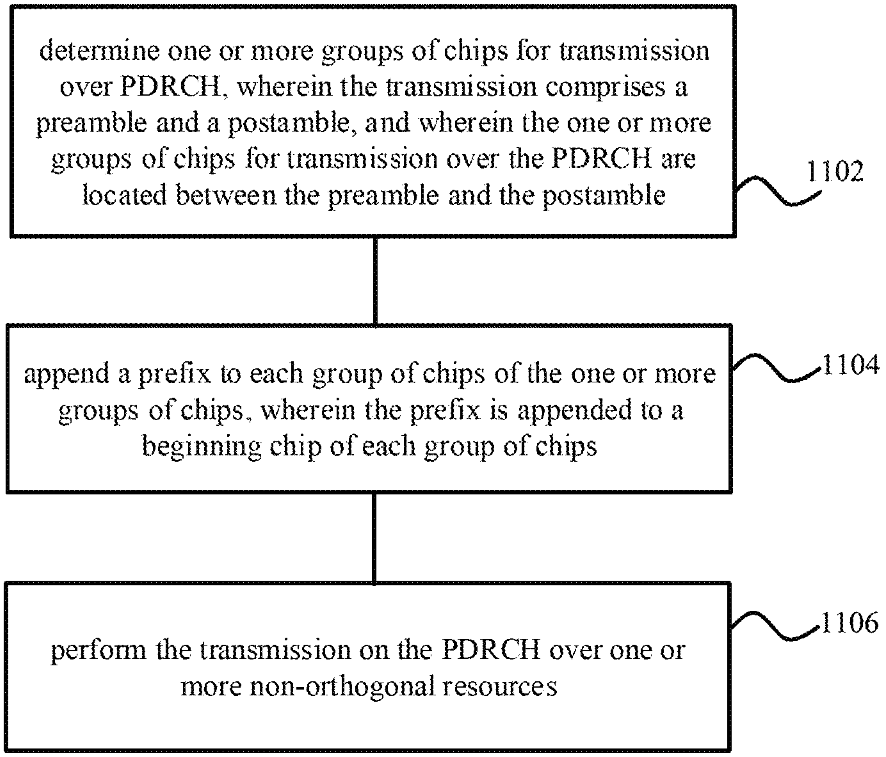
FIG. 11 illustrates a flowchart of a method performed by a UE in accordance with aspects of the present disclosure.

FIG. 11 illustrates a flowchart of a method in accordance with aspects of the present disclosure. The operations of the method may be implemented by a UE as described herein. In some implementations, the UE may execute a set of instructions to control the function elements of the UE to perform the described functions.

At 1102, the method may include determining one or more groups of chips for transmission over a PDRCH, wherein the transmission comprises a preamble and a postamble, and wherein the one or more groups of chips for transmission over the PDRCH are located between the preamble and the postamble. The operations of 1102 may be performed in accordance with examples as described herein. In some implementations, aspects of the operations of 1102 may be performed by a UE as described with reference to FIG. 8.

At 1104, the method may include appending a prefix to each group of chips of the one or more groups of chips, wherein the prefix is appended to a beginning chip of each group of chips. The operations of 1104 may be performed in accordance with examples as described herein. In some implementations, aspects of the operations of 1104 may be performed by a UE as described with reference to FIG. 8.

At 1106, the method may include performing the transmission on the PDRCH over one or more non-orthogonal resources. The operations of 1106 may be performed in accordance with examples as described herein. In some implementations, aspects of the operations of 1106 may be performed by a UE as described with reference to FIG. 8.

It should be noted that the method described herein describes a possible implementation, and that the operations and the steps may be rearranged or otherwise modified and that other implementations are possible.

Figure 12:
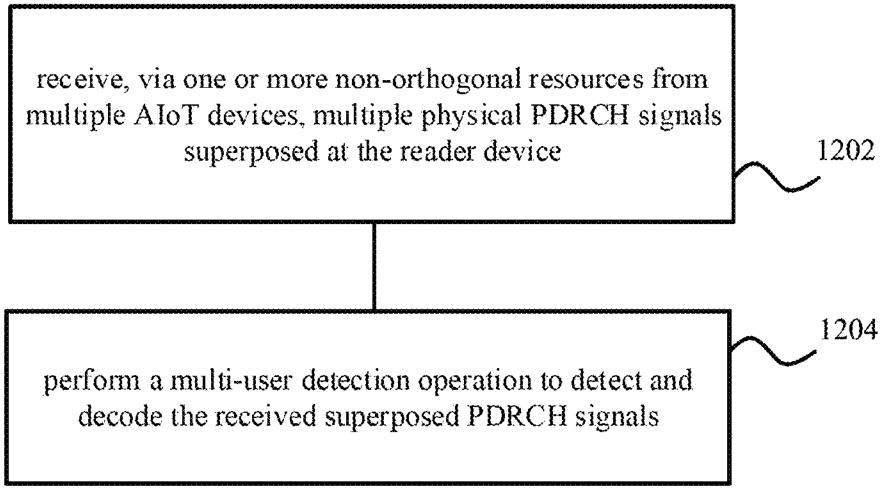
FIG. 12 illustrates a flowchart of a method performed by a reader device in accordance with aspects of the present disclosure.

FIG. 12 illustrates a flowchart of a method in accordance with aspects of the present disclosure. The operations of the method may be implemented by a UE, acting as a reader device, as described herein. In some implementations, the UE may execute a set of instructions to control the function elements of the UE to perform the described functions.

At 1202, the method may include receiving, via non-orthogonal resources from multiple AIoT devices, multiple PDRCH signals superposed at the reader device. The operations of 1202 may be performed in accordance with examples as described herein. In some implementations, aspects of the operations of 1202 may be performed by a UE as described with reference to FIG. 8.

At 1204, the method may include performing a multi-user detection operation to detect and decode the received superposed PDRCH signals. The operations of 1202 may be performed in accordance with examples as described herein. In some implementations, aspects of the operations of 1202 may be performed by a UE as described with reference to FIG. 8.

It should be noted that the method described herein describes a possible implementation, and that the operations and the steps may be rearranged or otherwise modified and that other implementations are possible.

Figure 13:
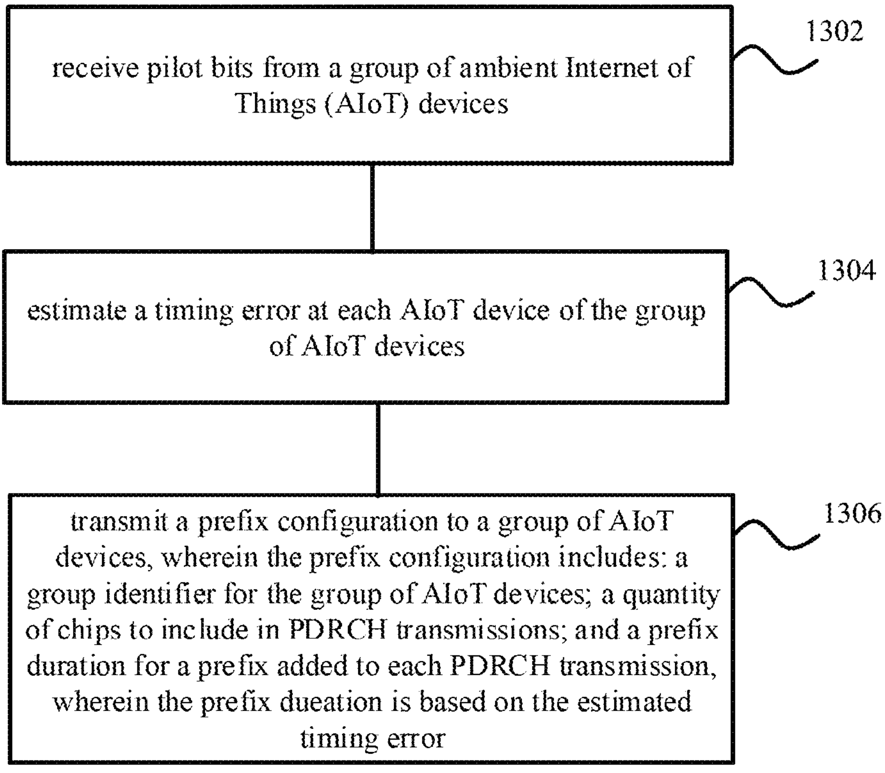
FIG. 13 illustrates a flowchart of a method performed by an NE in accordance with aspects of the present disclosure.

FIG. 13 illustrates a flowchart of a method in accordance with aspects of the present disclosure. The operations of the method may be implemented by an NE as described herein. In some implementations, the NE may execute a set of instructions to control the function elements of the NE to perform the described functions.

At 1302, the method may include receiving pilot bits from a group of AIoT devices. The operations of 1302 may be performed in accordance with examples as described herein. In some implementations, aspects of the operations of 1302 may be performed by an NE as described with reference to FIG. 10.

At 1304, the method may include estimating a timing error at each AIoT device of the group of AIoT devices. The operations of 1304 may be performed in accordance with examples as described herein. In some implementations, aspects of the operations of 1304 may be performed by an NE as described with reference to FIG. 10.

At 1306, the method may include transmitting a prefix configuration to the group of AIoT devices, wherein the prefix configuration includes: a group identifier for the group of AIoT devices, a quantity of chips to include in PDRCH transmissions, and a prefix duration for a prefix added to each PDRCH transmission, wherein the prefix duration is based on the estimated timing error. The operations of 1306 may be performed in accordance with examples as described herein. In some implementations, aspects of the operations of 1306 may be performed by an NE as described with reference to FIG. 10.

It should be noted that the method described herein describes a possible implementation, and that the operations and the steps may be rearranged or otherwise modified and that other implementations are possible.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
at least one memory; and
at least one processor coupled with the at least one memory and configured to cause the UE to:
determine one or more groups of chips for transmission over a physical device-to-reader channel (PDRCH),
wherein the transmission comprises a preamble and a postamble, and
wherein the one or more groups of chips for transmission over the PDRCH are located between the preamble and the postamble;
append a prefix to each group of chips of the one or more groups of chips,
wherein the prefix is appended to a beginning chip of each group of chips; and
perform the transmission on the PDRCH over one or more non-orthogonal resources.

2. The UE of claim 1, wherein the at least one processor is configured to cause the UE to perform the transmission on the PDRCH over the one or more non-orthogonal resources to a network entity or a reader device.

3. The UE of claim 1, wherein each group of chips comprises a quantity of chips, and wherein the quantity of chips is based at least in part on a configuration.

4. The UE of claim 3, where the configuration is based on a length of the PDRCH, variations of a sampling frequency offset (SFO) over time at the UE, variations of a carrier frequency offset (CFO) over time at the UE, or combinations thereof.

5. The UE of claim 1, wherein the at least one processor is configured to cause the UE to receive signaling that indicates a configuration from a network entity or a reader device, wherein the signaling comprises a medium access control-control element (MAC-CE).

6. The UE of claim 1, wherein the at least one processor is configured to cause the UE to:
receive an indication of an orthogonal sequence,
wherein the prefix comprises the orthogonal sequence, and
wherein the orthogonal sequence is associated with auto-correlation properties or cross-correlation properties satisfying a criterion.

7. The UE of claim 1, wherein a length of the prefix is based on a highest timing error caused by a sampling frequency offset (SFO) associated with another UE of a group of UEs, including the UE, that share the one or more non-orthogonal resources.

8. The UE of claim 1, wherein the at least one processor is configured to cause the UE to:
receive a configuration that identifies a certain delay of transmission based on a size of the PDRCH; and
perform the transmission on the PDRCH after the certain delay.

9. The UE of claim 1, wherein the UE is an ambient Internet of Things (AIoT) device.

10. The UE of claim 1, wherein the UE is a passive AIoT device, a semi-passive AIoT device, or an active AIoT device.

11. A processor for wireless communication, comprising:
at least one controller coupled with the at least one memory and configured to cause the processor to:

determine one or more groups of chips for transmission over a physical device-to-reader channel (PDRCH), wherein the transmission comprises a preamble and a postamble, and wherein the one or more groups of chips for transmission over the PDRCH are located between the preamble and the postamble;

append a prefix to each group of chips of the one or more groups of chips, wherein the prefix is appended to a beginning chip of each group of chips; and perform the transmission on the PDRCH over non-orthogonal resources.

12. The processor of claim 11, wherein each group of chips comprises a quantity of chips, and wherein the quantity of chips is based at least in part on a configuration.

* * * * *